United States Patent
Eisele et al.

(10) Patent No.: US 7,506,823 B2
(45) Date of Patent: Mar. 24, 2009

(54) WASHING NOZZLE FOR DISCHARGING A LIQUID CLEANING OR WASHING MEDIUM

(75) Inventors: Simone Eisele, Ingersheim (DE); Uwe Lasebnick, Ditzingen (DE)

(73) Assignee: Valeo Systemes d'Essuyage, La Verriere (FR)

( * ) Notice: Subject to any disclaimer, the term of this patent is extended or adjusted under 35 U.S.C. 154(b) by 288 days.

(21) Appl. No.: 10/539,880

(22) PCT Filed: Dec. 15, 2003

(86) PCT No.: PCT/EP03/14240

§ 371 (c)(1),
(2), (4) Date: Jun. 16, 2005

(87) PCT Pub. No.: WO2004/056489

PCT Pub. Date: Jul. 8, 2004

(65) Prior Publication Data

US 2006/0157591 A1    Jul. 20, 2006

(30) Foreign Application Priority Data

Dec. 19, 2002   (DE)   ................................ 102 59 563

(51) Int. Cl.
*B05B 1/10* (2006.01)
*B60S 1/46* (2006.01)
*B05B 7/06* (2006.01)

(52) U.S. Cl. ................. 239/284.1; 239/284.2; 239/426; 239/429; 239/407; 239/431

(58) Field of Classification Search ............. 239/284.1, 239/284.2, 426, 407, 429, 439, 431

See application file for complete search history.

(56) References Cited

U.S. PATENT DOCUMENTS

| | | | | |
|---|---|---|---|---|
| 2,914,256 A | * | 11/1959 | O'Shei | ........................ 239/305 |
| 4,721,251 A | * | 1/1988 | Kondo et al. | ................. 239/412 |
| 4,802,630 A | | 2/1989 | Kromrey et al. | |
| 4,890,793 A | * | 1/1990 | Fuglistaller et al. | ......... 239/427 |
| 5,083,339 A | * | 1/1992 | Bristow | ................. 15/250.002 |
| 5,170,942 A | * | 12/1992 | Spink et al. | .............. 239/427.3 |
| 6,062,491 A | | 5/2000 | Hahn et al. | |
| 6,338,444 B1 | * | 1/2002 | Swan | ...................... 239/428.5 |
| 6,412,708 B1 | | 2/2002 | Bohringer | |
| 6,497,375 B1 | * | 12/2002 | Srinath et al. | ............. 239/589.1 |
| 6,520,424 B1 | | 2/2003 | Lesser et al. | |
| 6,705,538 B2 | * | 3/2004 | Fecht et al. | ..................... 239/8 |
| 2002/0005440 A1 | | 1/2002 | Holt et al. | |
| 2002/0134862 A1 | | 9/2002 | Fecht et al. | |

FOREIGN PATENT DOCUMENTS

| | | |
|---|---|---|
| DE | 1 205 404 | 11/1965 |
| DE | 35 17 136 | 10/1986 |
| DE | 43 40 444 | 6/1995 |
| DE | 44 22 590 | 1/1996 |
| DE | 195 03 059 | 8/1996 |
| EP | 0225624 | 6/1987 |
| FR | 2342103 | 9/1977 |
| JP | 2000/344062 | 12/2000 |

* cited by examiner

*Primary Examiner*—Len Tran
*Assistant Examiner*—James S Hogan
(74) *Attorney, Agent, or Firm*—Jacox, Meckstroth & Jenkins

(57) ABSTRACT

In a washing nozzle for use on vehicles for applying a liquid cleaning or washing medium, means are provided for acting within the nozzle on a main jet generated in the nozzle with a collision jet in order thus to modify the nozzle jet which emerges.

15 Claims, 10 Drawing Sheets

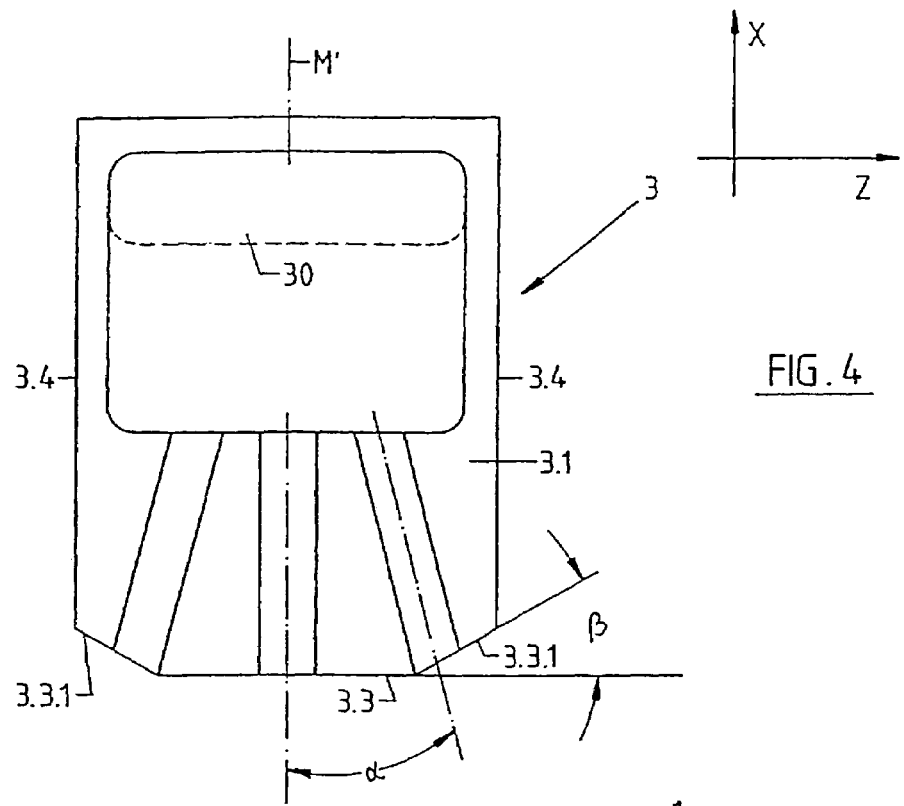
FIG. 4
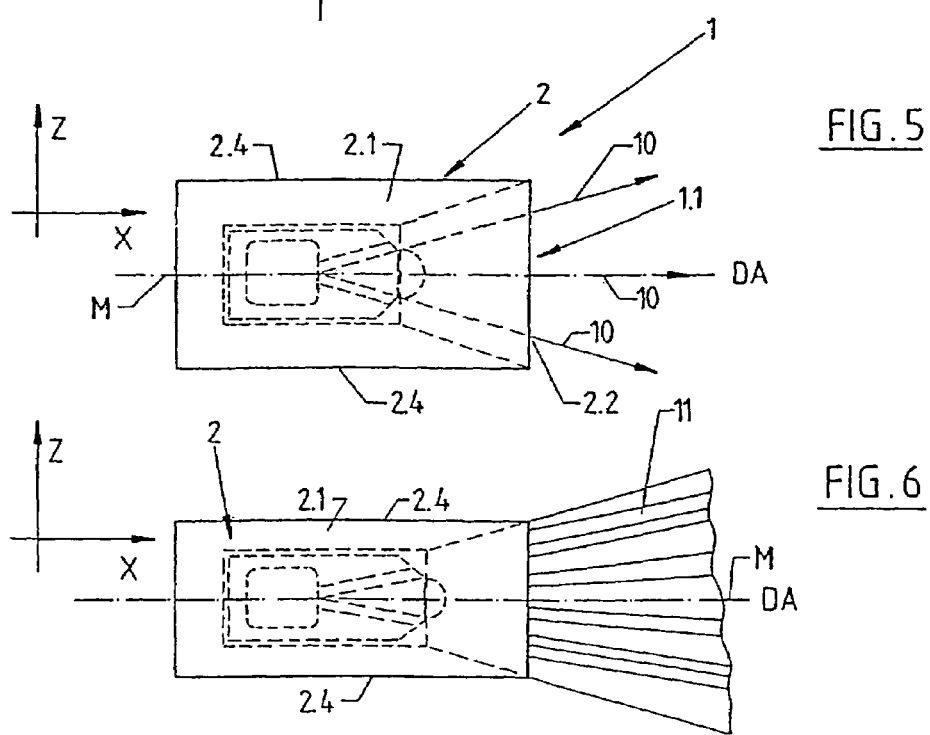
FIG. 5
FIG. 6

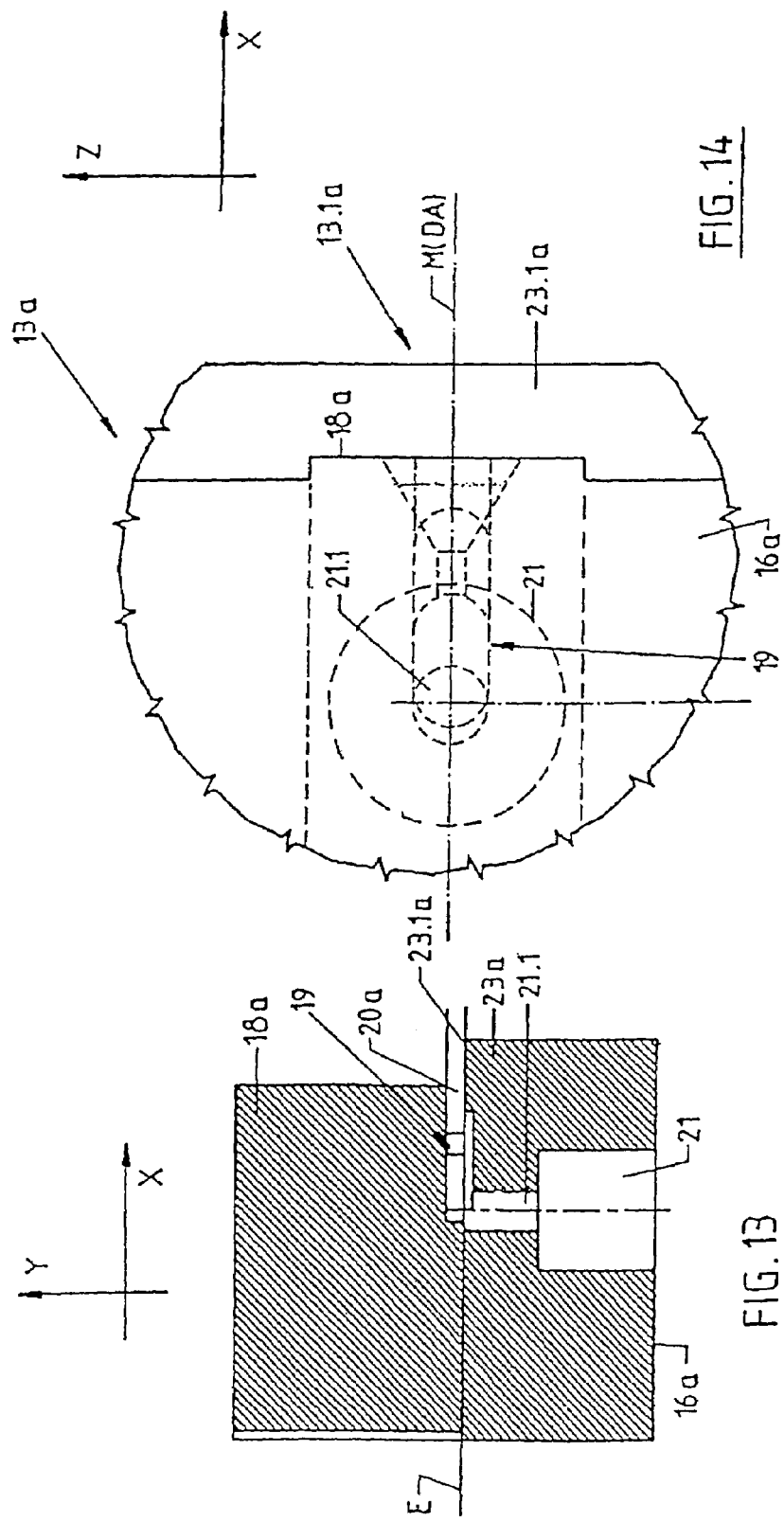

WASHING NOZZLE FOR DISCHARGING A LIQUID CLEANING OR WASHING MEDIUM

BACKGROUND OF THE INVENTION

The invention relates to a washing nozzle and, more particularly, to a washing nozzle for use in washing or cleaning systems on vehicles for cleaning vehicle windows, in particular front windows or windscreens, headlamps, rear lights and/or cameras.

Within the context of the invention, a washing nozzle is therefore in particular a nozzle for applying the liquid cleaning or washing medium to an area of the vehicle which is to be cleaned, that is to say for example to vehicle windows, in particular front windows or windscreens, headlamps, rear lights and/or cameras. Within the context of the invention, the liquid cleaning or washing medium is in particular water, preferably with active washing additives and/or frost protection agents.

Within the context of the invention, a punctiform nozzle jet is a nozzle jet having a cross section which remains constant or essentially constant, that is to say a nozzle jet which does not diverge or diverges only slightly. Within the context of the invention, a flat or fan-shaped nozzle jet is in particular a nozzle jet which has a rectangular cross section at least when it strikes the surface to be cleaned and which, starting from the washing nozzle or nozzle opening, increasingly widens in an axis which runs perpendicular to the jet axis.

Washing nozzles for use on vehicles, in particular road vehicles, for applying a liquid cleaning or washing medium are known in various designs. For example, windscreen washing nozzles are known (WO 00/12361) which consist of a nozzle body with a line for supplying the cleaning or washing medium and with a plate-shaped nozzle chip or insert arranged in a recess of the nozzle body, said insert being accommodated in a form-fitting manner in the recess of the nozzle body and being provided on one side of its surface with a number of channel grooves which, when the insert is mounted in the nozzle body, form nozzle channels which are connected to the supply channel and which each form a nozzle opening, namely for generating a number of diverging jets of the liquid cleaning or washing medium.

Also known are windscreen washing nozzles (DE 44 22 590 A1) for generating a fan-shaped or flat nozzle jet, comprising a nozzle body in which a supply channel for the liquid cleaning or washing medium is formed, which merges via a narrowing into a nozzle channel or expansion chamber which expands in terms of its width in the flow direction and ends in an essentially slot-shaped nozzle opening.

It is also known (DE 1 205 404) to deflect an essentially punctiform nozzle jet emerging from a single nozzle opening by means of a deflection plate provided outside the washing nozzle and thus to deform said jet such that the cleaning medium is distributed as widely as possible over the surface to be cleaned, that is to say the windscreen.

Known nozzles in principle have the disadvantage that the jet form and/or jet type, in particular including the droplet size and the speed thereof in the emerging nozzle jet, are not sufficient for an optimal cleaning or wiping effect, and/or the volume stream and thus the consumption of liquid cleaning medium is too great in comparison to the effect achieved.

SUMMARY OF THE INVENTION

It is an object of the invention to provide a novel washing nozzle which is improved in terms of its function. In order to achieve this object, a washing nozzle is designed for use on vehicles for applying a liquid cleaning or washing medium, comprising at least one nozzle channel in a nozzle body, comprising at least one nozzle opening formed by the nozzle channel for the exit of at least one nozzle jet, comprising at least one supply line which opens into the nozzle channel for supplying the cleaning medium, and comprising at least one section in the nozzle channel for generating at least one primary or main jet from the cleaning medium. characterized by means for acting on the at least one main jet with a collision jet within the nozzle body in a collision and/or mixing chamber provided upstream of the nozzle opening in the flow direction.

It is an object of the invention to provide a novel washing nozzle which is improved in terms of its function. In order to achieve this object, a washing nozzle is designed according to claim 1.

In the washing nozzle according to the invention, which can be implemented in a large number of variants, within the washing nozzle, at a narrowing of the nozzle channel or else at a least one exit opening of an inner nozzle channel section, a nozzle jet is generated which is then acted upon by a collision jet within the washing nozzle or in a collision and/or mixing chamber formed therein, for example by a section of the nozzle channel, the flow direction of said collision jet being oriented perpendicular or transversely to the axis direction of the main jet as it acts on the latter.

In one embodiment, the washing nozzle has at least two supply lines for the liquid cleaning medium, namely one supply line for generating the main jet and one supply line for generating the collision jet. In this embodiment, it is then possible to operate the washing nozzle in at least two different operating modes, namely in a first mode in which the washing nozzle generates at least one punctiform jet and in a second mode in which, using the collision jet, the main jet is modified, that is to say in particular by the collision jet being "atomized", in such a way that a diverging jet is produced, i.e. a fan-shaped nozzle jet given a suitable design of the washing nozzle, the nozzle channel and the nozzle opening.

In a further possible embodiment, within the washing nozzle, there is generated from the liquid cleaning medium fed in via a line a main stream for forming a main jet and an auxiliary or collision stream for forming the collision jet, wherein, once again within the washing nozzle or within the collision and/or mixing chamber, the main jet which is already present there is then acted upon by the collision jet and modified by the latter.

Further developments of the invention form the subject matter of the dependent claims. The invention will be explained in more detail below with reference to the figures and on the basis of examples of embodiments. In the figures:

DESCRIPTION OF THE DRAWINGS

FIGS. 3 and 4 show the nozzle chip in front view and in plan view;

FIGS. 5 and 6 in each case show in a simplified diagram a plan view of the washing nozzle of FIG. 1 in two different operating modes;

FIGS. 13 and 14 show diagrams similar to FIGS. 7 and 8 in the case of a further possible embodiment;

DETAILED DESCRIPTION OF THE INVENTION

Figure 1:
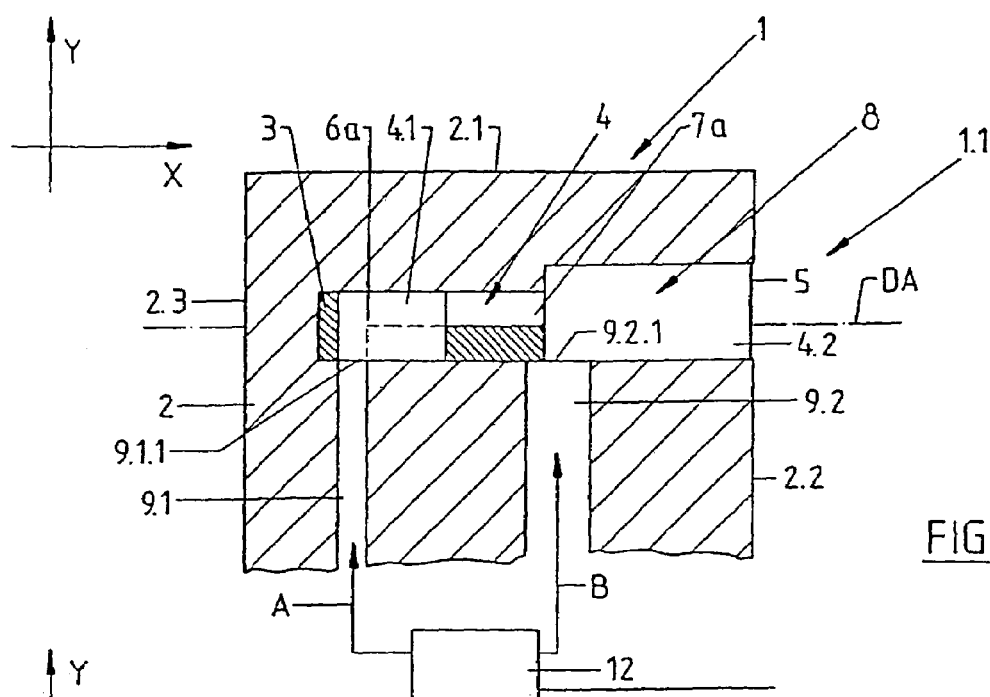
FIG. 1 shows in a simplified diagram and in section a washing nozzle (multifunction nozzle) according to the invention.
Figure 2:
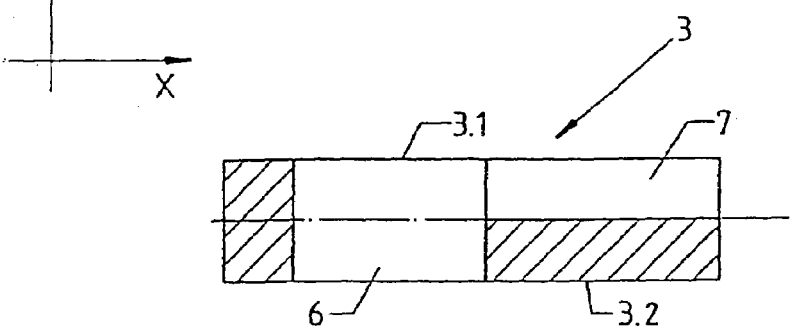
FIG. 2 shows in a simplified diagram and in section a nozzle insert or chip for use in the washing nozzle of FIG. 1.
Figure 3:
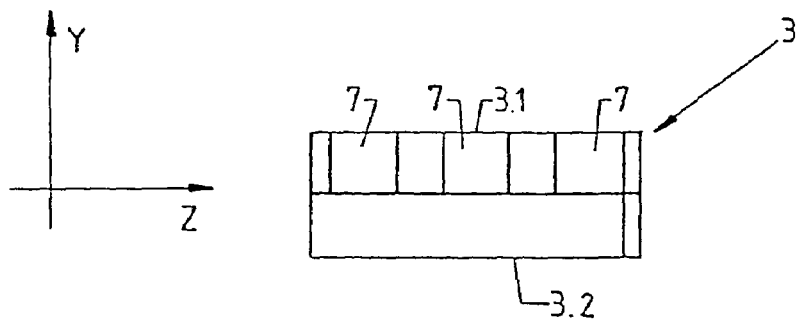

For the purpose of simpler explanation, in each case the three spatial axes which are oriented perpendicular to one another, namely the X-axis, the Y-axis and the Z-axis, are shown in the figures, wherein the X-axis coincides with the nozzle axis DA.

The nozzle which bears the general reference 1 in FIGS. 1 to 6 serves as a washing and cleaning nozzle for cleaning windscreens, headlamps, rear lights, cameras, etc. and consists in a manner known per se of a nozzle body 2, which is made of a suitable material and in a suitable technology, for example as an injection-moulded part made of plastic, and of a nozzle chip or insert 3, which is likewise made of a suitable material, e.g. plastic, possibly even of a flexible plastic.

In the illustrated embodiment, the nozzle body 2 is cube-shaped and has an upper side 2.1, a front side 2.2, a rear side 2.3 and two longitudinal sides 2.4. Of course, other shapes are also conceivable for the nozzle body 2.

Provided in the nozzle body 2, which is shown as one piece in FIGS. 1-6, but may also be designed as more than one piece, is a recess 4 which in the illustrated embodiment is composed of two sections which adjoin one another in the direction of the nozzle axis DA or X-axis, namely of the innermost section 4.1 and the section 4.2. In the illustrated embodiment, the section 4.1 has a constant, rectangular cross section in cross-sectional planes parallel to the YZ plane, namely with the smaller cross-sectional dimension in the Y-axis. At the front side 1.1 of the nozzle 1 or at the front side 2.2 of the nozzle body 2, the section 4.2 forms the slot-shaped nozzle opening 5 which lies with its longitudinal extent in the direction of the Z-axis, and in the illustrated embodiment has a constant cross-sectional dimension in the Y-axis which is nevertheless somewhat greater than the cross-sectional dimension of the section 4.1 in this Y-axis. The width of the section 4.2 in the Z-axis increases in a funnel-like manner as the distance from the section 4.1 increases.

At the transition to the section 4.1, the section 4.2 has in the direction of the Z-axis a width which in the illustrated embodiment is equal to the corresponding width of the section 4.1. The lower boundary surfaces of the sections 4.1 and 4.2 which lie in the XZ plane and further away from the upper side 2.1 are arranged in a common plane. By virtue of the greater height which the section 4.2 has in the Y-axis, a step is formed at the transition 4.3 between the sections 4.1 and 4.2.

In the illustrated embodiment, the nozzle insert 3 is plate-shaped, namely such that it is received in a form-fitting manner by the section 4.1. In the illustrated embodiment, the nozzle insert 3 can be mounted by pushing it in through the nozzle opening 5. The nozzle insert 3 has an opening or recess 6 which in the illustrated embodiment is rectangular, extends from the upper side 3.1 to the lower side 3.2 of the nozzle insert 3 and is opened into by in each case one end of the three channel grooves 7 formed in the upper side 3.1. The channel grooves 7 end with their other ends in each case at a peripheral side 3.3 of the nozzle insert 3 designed as a rectangular plate, namely the central channel groove 7 ends in the center (center plane M') of this side 3.3 and the two other, outer channel grooves 7 in each case end in a bevelled corner region 3.3.1 at the transition from the side 3.3 to an adjacent longitudinal side 3.4.

The channel grooves 7 are arranged such that the central channel groove 7 lies with its longitudinal extent or axis parallel to the two sides 3.4 and the two outer channel grooves 7 or their axes have an increasing distance from the central channel groove 7 as the distance from the opening 6 increases. The angle $\alpha$, which the axis of an outer channel groove 7 in each case encloses with the longitudinal axis of the central channel groove 7, is equal to the angle $\beta$ which the bevelled regions 3.3.1 form with the plane of the side 3.3. In the illustrated embodiment, the nozzle insert 3 is furthermore symmetrical with respect to the center plane M' which includes the axis of the central channel groove 7 and runs perpendicular to the upper side 3.1 and lower side 3.2.

In the assembled state, the insert 3 bears with its lower side 3.2 against the lower side of the section 4.1 remote from the upper side 2.1 of the nozzle body 2, and bears with its upper side 3.1 against the upper side of this section. The opening 6 thus forms a chamber 6a into which a first supply channel 9.1 for the liquid cleaning medium (e.g. washing water) opens, said supply channel being formed in the nozzle body 2. The channel grooves 7 form internal nozzle channel sections 7a which open into the section 4.2 of the washing nozzle 1 in a manner diverging from the chamber 6a. The axes of the diverging channel sections 7a are arranged in a common XZ plane and the axis of the central channel section 7a lies in the X-axis or in the nozzle axis DA. The cross sections of the channel sections 7a are smaller than the cross section of the section 4.2 at the transition 4.3.

Formed in the nozzle body 2 is a second supply channel 9.2 which likewise lies with its longitudinal extent in the Y-axis and opens into the section 4.2 which forms the nozzle channel section which expands in terms of its width towards the slot-shaped nozzle opening 5. The mouth or opening 9.2.1 of the supply channel 9.2, like the mouth or opening 9.1.1 of the supply channel 9.1, is located at the lower side of the recess 4 in the XZ plane remote from the nozzle body upper side 2.1, and specifically the mouth of the supply channel 9.2 is located at the transition 4.3 such that this mouth is still slightly covered by the front side 3.3 of the insert 3.

In the illustrated embodiment, the sections 4.1 and 4.2 and also the channel sections 7a are designed and arranged to be symmetrical with respect to an imaginary center plane M, which center plane includes the X-axis and also the axes of the supply channels 9.1 and 9.2 and is oriented perpendicular to the XZ plane.

As shown in FIGS. 5 and 6, two different operating modes are possible with the washing nozzle 1, namely a first operating mode in which the liquid cleaning medium is fed in only via the supply channel 9.1 (arrow A), and specifically with a predefined pressure so that three full jets 10 of the liquid cleaning medium are generated by the internal nozzle channel sections 7a, said jets emerging through the section 4.2 at the nozzle opening 5 (FIG. 1). The liquid cleaning medium is in this case fed to the washing nozzle 1 or to the supply channel 9.1 at a given pressure, for example greater than 1.5 bar.

The second operating mode is shown in FIG. 6. In this operating mode, the liquid cleaning medium is fed in both via the supply channel 9.1 (arrow A) and via the supply channel 9.2 (arrow B). In this case, three primary or main jets are once again firstly generated at the openings of the nozzle channel sections 7a from the cleaning medium fed in via the supply channel 9.1. However, these primary or main jets are then atomized by virtue of the cleaning medium (collision jet) emerging perpendicular to the respective jet direction via the supply channel 9.2 or the opening 9.2.1 thereof into the section 4.2, so that a fan-shaped jet 11 emerges from the nozzle opening 5 onto the surface to be cleaned. The section 4.2 in this case acts as a collision and/or mixing chamber. The upper side which delimits the section 4.2 at the top and the lower side which delimits said section at the bottom serve as guide lips which shape and stabilize the emerging fan-shaped jet 11. In the operating mode of FIG. 6, the liquid cleaning medium is fed to the washing nozzle 1 or to the supply channels 9.1 and 9.2 at a reduced pressure compared to the operating mode of FIG. 5, for example at a pressure of less than 1.5 bar.

The punctiform jets 10 or the operating mode of FIG. 5 are/is suitable for example for cleaning vehicle front or rear windows and/or headlamps and/or cameras at a high travelling speed of a vehicle. The fan-shaped jet 11 is suitable in particular for cleaning at a low travelling speed.

The changeover between the two operating modes takes place for example by a valve arrangement 12 which is shown in a highly schematic manner in FIG. 1 and which is provided and pressure-controlled jointly for a number of nozzles 1 for example. If necessary, additional guide lips for stabilizing in particular the jet 11 may be provided at the nozzle exit opening.

The advantages of the washing nozzle 1 compared to known nozzles consist inter alia in the possibility of changing over between the two operating modes (punctiform jets or full jets 10 and fan-shaped jet 11), in the optimal adaptation to different travelling speeds, in the optimal distribution of the cleaning liquid over the surface to be cleaned in each case, which is likewise adapted to the respective travelling speed of the vehicle, and in a small design despite the possibility of changing the operating mode and despite the washing nozzle 1 being designed as a multifunction nozzle.

Figure 7:
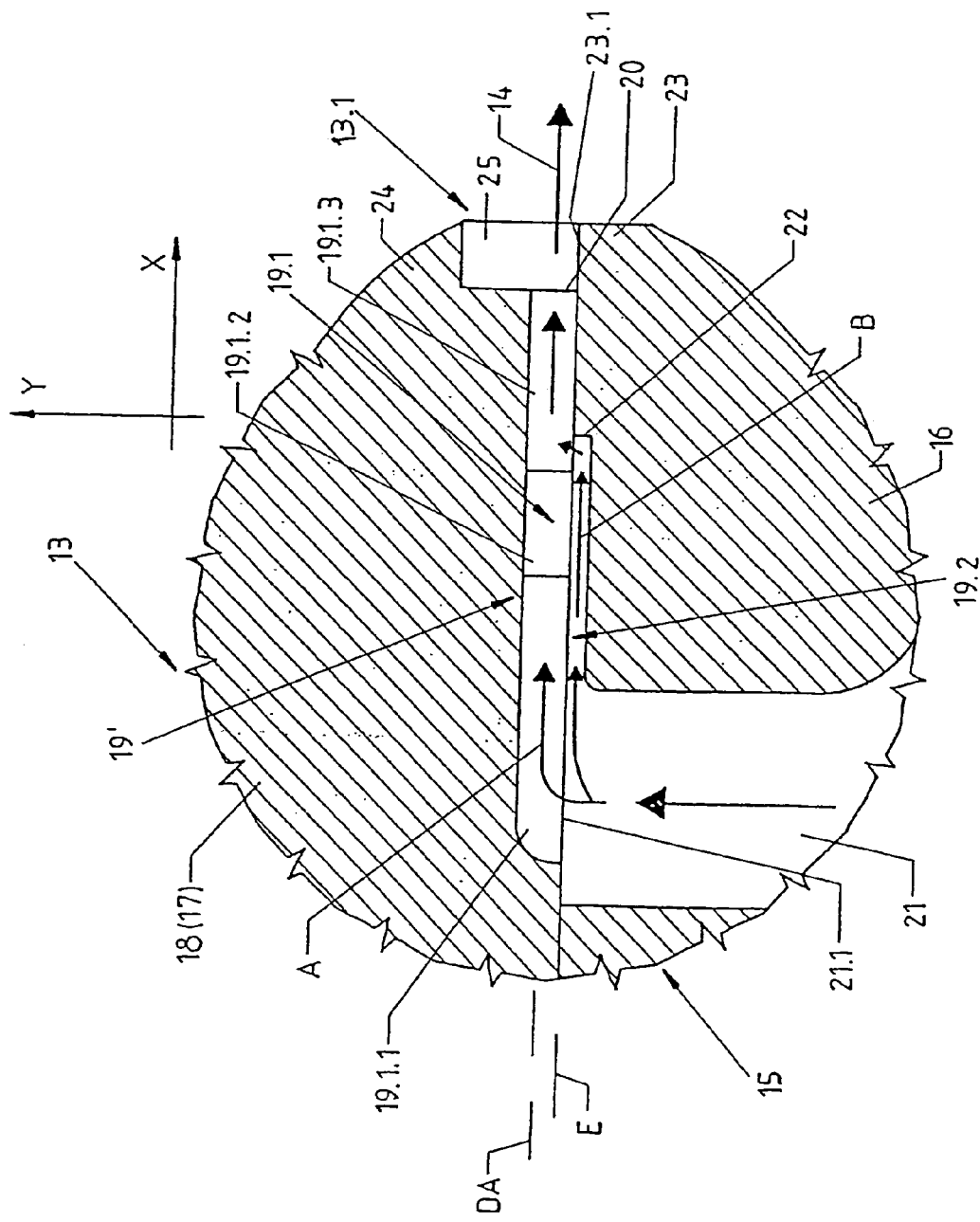
FIG. 7 shows in a simplified part-diagram and in section a further possible embodiment of the washing nozzle according to the invention.
Figure 8:
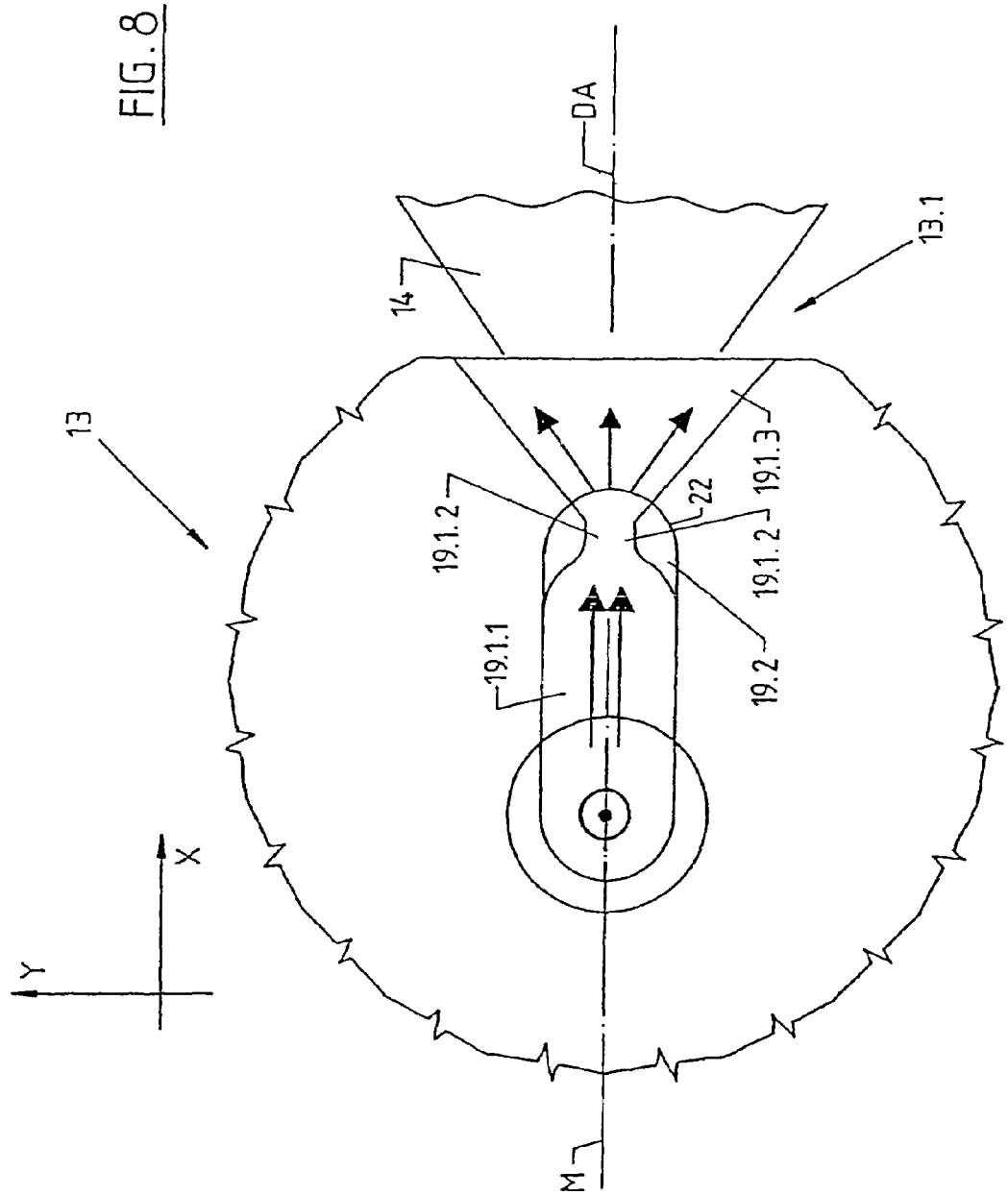
FIG. 8 shows in a schematic diagram the design of the liquid or nozzle channel of the washing nozzle of FIG. 7.
Figure 9:
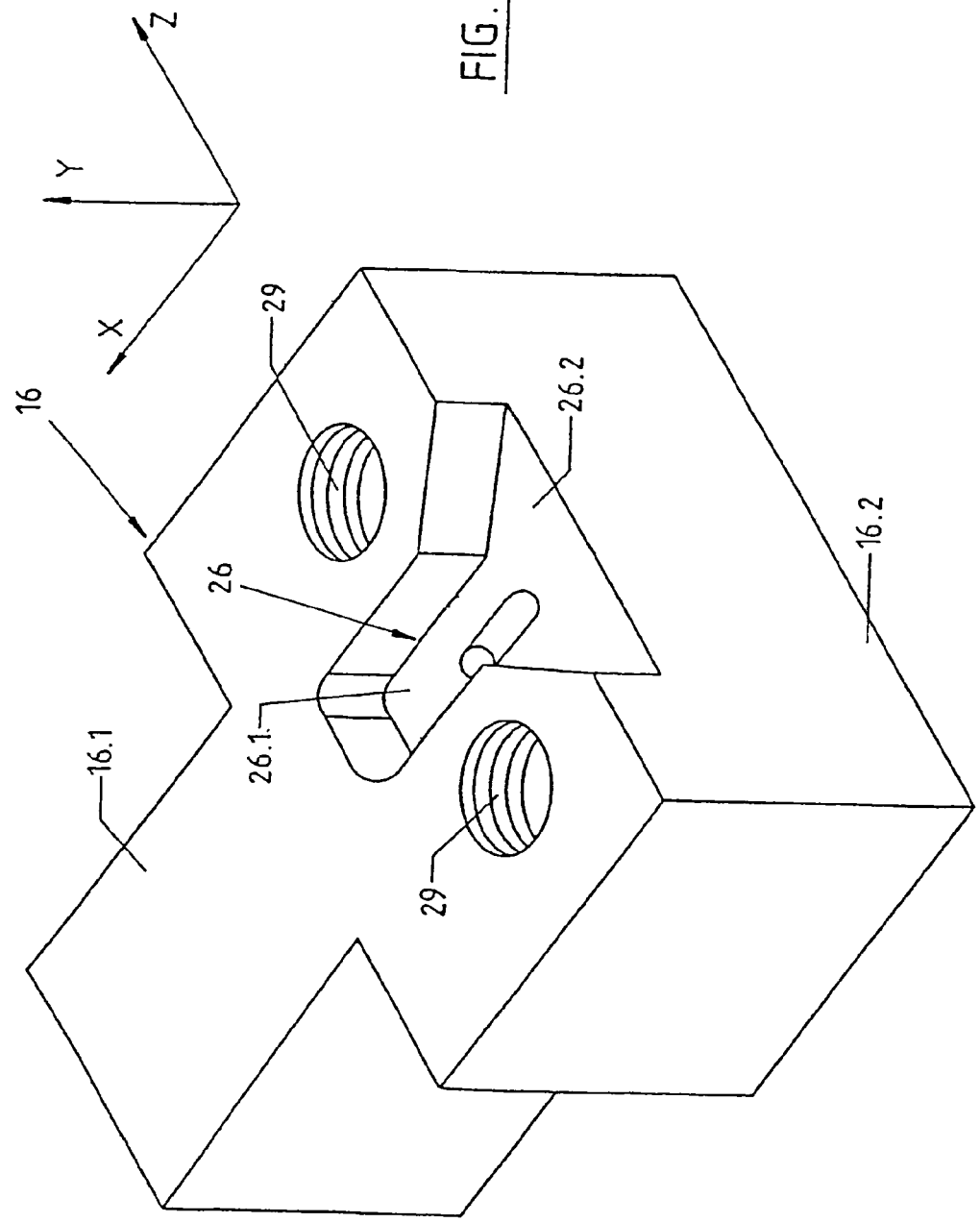
FIGS. 9 and 10 show a perspective diagram and a plan view of the lower part of the two-part washing nozzle of FIG. 7, with the nozzle upper part removed.
Figure 10:
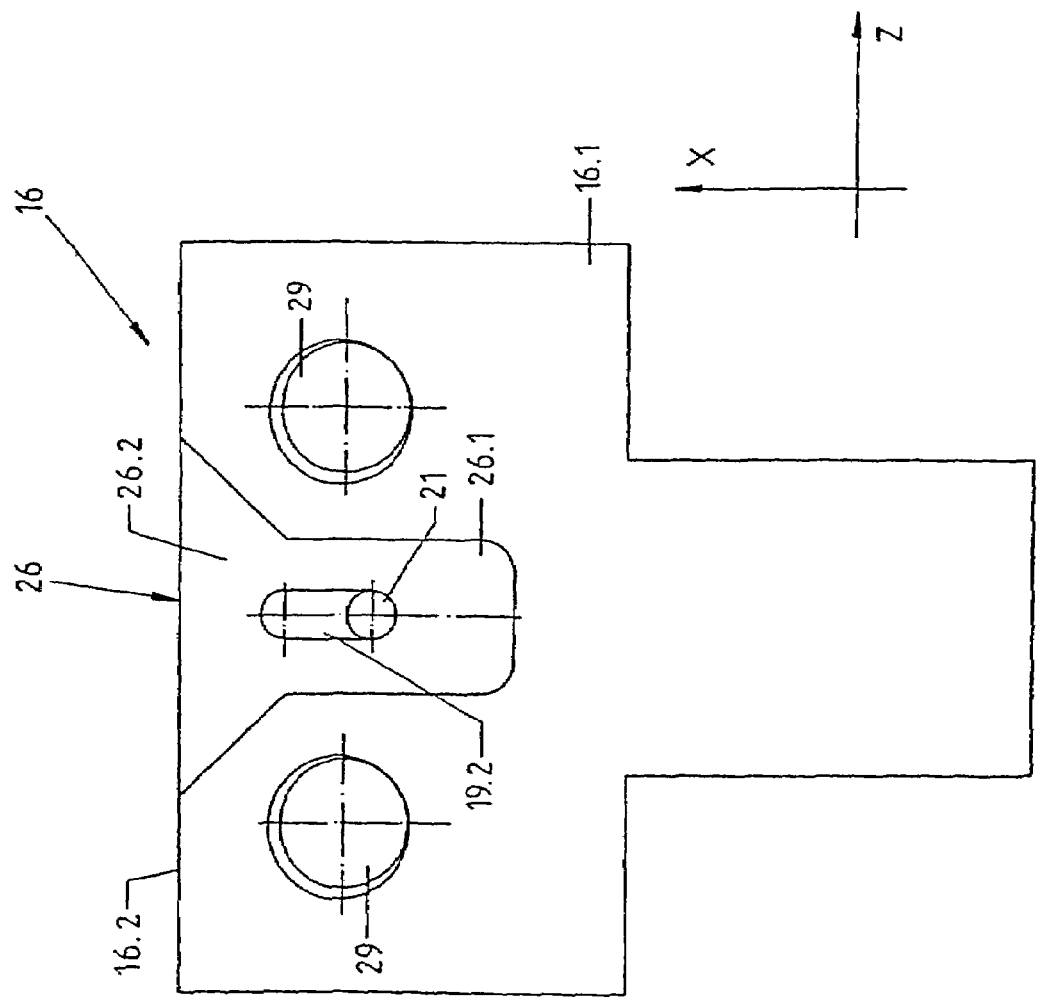

FIGS. 7 and 8 show in a somewhat schematic diagram, as a further possible embodiment of the invention, a washing nozzle 13 which in terms of its function corresponds to the washing nozzle 1 in that a second jet (collision jet) is introduced into a main jet of the liquid cleaning medium, perpendicular to the direction of this jet, i.e. perpendicular to the nozzle axis DA, in order to form an optimal, flat and fan-shaped nozzle jet 14, so that in this case the main jet is broken up or atomized, and specifically in this embodiment with the result of an increase in the droplet size in the nozzle jet 14.

In the illustrated embodiment, the washing nozzle 13 has a nozzle body 15 which is formed in two parts, consisting of the nozzle body lower part 16 and the nozzle body upper part 17 with an integrally formed nozzle insert 18. At the transition between the lower part 16 and the upper part 17 or the insert 18 (plane E), a nozzle channel 19 is formed in the nozzle body 15, which nozzle channel ends at a front side 13.1 of the nozzle 13 in a slot-shaped nozzle opening 20 for the exit of the nozzle jet 14.

The nozzle channel 19 lies with its longitudinal extent once again in the X-axis, which is also the nozzle axis DA. The nozzle opening 20 lies with its longitudinal extent in the Z-axis, wherein the plane of the nozzle opening 20 is once again the YZ plane. At the end remote from the nozzle opening 20, a supply channel 21 for the liquid cleaning medium opens into the nozzle channel 19, namely via the mouth 21.1. The supply channel 21 is oriented with its axis in the Y-axis at least in the region of this mouth.

As can be seen very clearly in particular from FIGS. 7 and 8, the nozzle channel 19 is composed of two nozzle channel sections 19.1 and 19.2 which are formed by trough-like depressions or recesses which are integrally formed in the lower part 16 and in the upper part 17 or in the insert 18, namely on surfaces which adjoin one another in the plane E perpendicular to the Y-axis, so that the trough-like recesses or the channel sections 19.1 and 19.2 formed thereby supplement the nozzle channel 19.

Figure 15:
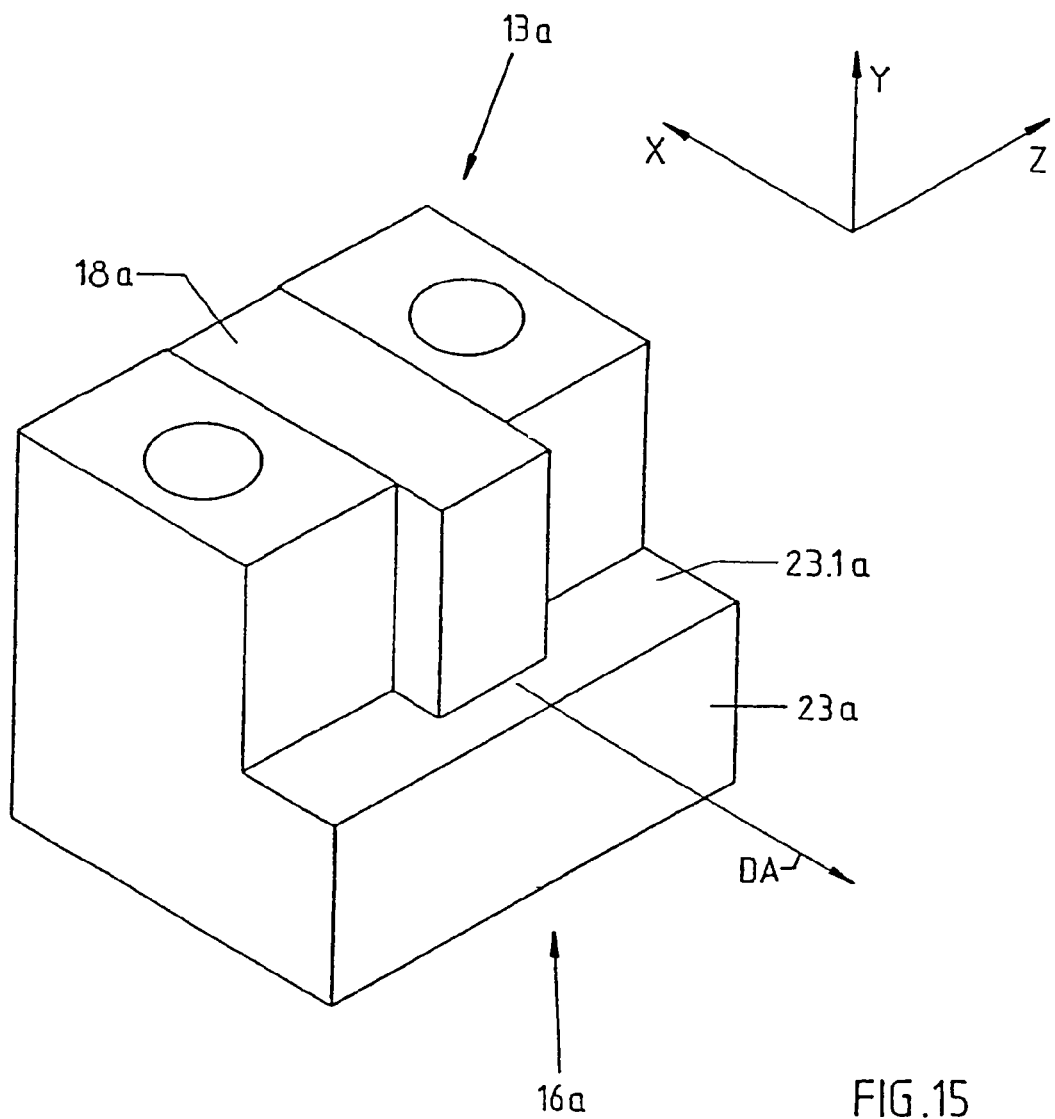
FIG. 15 shows a simplified perspective diagram of the washing nozzle of FIGS. 13 and 14.

FIG. 15 shows a simplified perspective diagram of the washing nozzle of FIGS. 13 and 14.

In the illustrated embodiment, the nozzle channel section 19.1 consists of three part-sections which adjoin one another in the direction of the nozzle axis DA or X-axis, namely of the elongate part section 19.1.1 starting from the opening 21.1 with a constant width in the direction of the Z-axis and a constant height in the direction of the Y-axis, the section 19.1.2 which adjoins the part-section 19.1.1 in the direction towards the nozzle opening 20, the width of which section 19.1.2 is reduced and then increased again in the direction of the Z-axis with the height (Y-axis) remaining constant, and the section 19.1.3 which ultimately forms the nozzle opening 20, the width of which section 19.1.3 increases in a funnel-shaped or cone-shaped manner up to the width of the nozzle opening 20 in the direction of the Z-axis with the height (Y-axis) remaining constant.

The nozzle channel section 19.2 or the trough-like recess in the lower part 16 which forms this section opens with one end into the supply channel 21 or into the opening 21.1 and extends in the direction of the X-axis below the part-section 19.1.2 in such a way that the end 22 of the nozzle channel section 19.2 or of the recess which forms this section 19.2 which is remote from the supply channel 21 lies in the region of the part-section 19.1.3, but at a distance from the nozzle opening 20 which is greater than the distance from the part-section 19.1.2.

If the liquid cleaning medium is fed to the washing nozzle 13 at the supply channel 21 with a predefined volume and with a predefined pressure, essentially two initially parallel streams are produced within the nozzle channel 19, namely once again the main stream A in the nozzle channel section 19.1, from which a fan-shaped primary flat jet is generated in the region of the narrowing formed by the part-section 19.1.2 and the adjoining part-section 19.1.3 which acts as an expansion chamber, and in the channel section 19.2 the collision stream B which in this channel section 19.2 initially flows parallel to the main stream A then strikes the deflection surface formed by the end 22 and, deflected at the latter essentially in the direction of the Y-axis and thus transversely to the flow direction of the main stream, strikes said main stream and as a result modifies or breaks up the main stream A in the part-section 19.1.3 in order to improve the properties of the nozzle jet 14 which emerges. The part-section 19.1.3 once again serves as a collision and/or mixing chamber. The part-length of the nozzle channel 19 or of the part-section 19.1.3 which follows the end 22 in the flow direction also acts as a calming path and serves to stabilize and align the nozzle jet 14.

In the illustrated embodiment, the nozzle channel 19 or the channel sections 19.1 and 19.2 which form this channel are designed to be symmetrical with respect to an imaginary center plane M, which center plane includes the X-axis and also the axis of the supply channel 21 and is oriented perpendicular to the plane E.

As shown in FIG. 7 at 23 and 24, the nozzle body 15 or the lower part 16 and upper part 17 are continued beyond the actual nozzle opening 20 on the nozzle front side 13.1, namely in such a way that the nozzle opening 20 is located within a recess 25 which is open on the nozzle front side 13.1 and which has a height in the direction of the Y-axis which is considerably greater than the height of the nozzle opening 20, the width of which recess in the direction of the X-axis at the nozzle opening 20 is at least equal to the width of this nozzle opening and widens outwards at the same angle as the nozzle opening.

FIGS. 9-12 show the design of the lower part 16 and of the upper part 17 in greater detail. Both parts are designed in the shape of blocks or chunks, and namely the lower part 16 on its upper side 16.1 which lies in the XZ plane comprises a recess 26 which is open towards this upper side and towards the front side 16.2 lying in the YZ plane, which recess in the illustrated embodiment has a constant depth in the direction of the Y-axis and is formed by two sections which adjoin one another in the direction of the X-axis, and namely by the section 26.1 with an essentially constant width and by the adjoining section 26.2, the width of which increases in the direction of the Z-axis as the distance from the section 26.1 increases and ultimately forms the recess 25 of the washing nozzle 13.

The supply channel 21 opens onto the base of the section 26.1, which defines the plane E. Furthermore, the nozzle channel section 19.2 or the trough-like recess which forms this channel section is made in the base of the section 26.1.

The upper part 17 consists of a cube-shaped basic body 27 and of the insert 18 which is likewise cube-shaped and is integrally formed on the lower side 27.1 of the basic body. The dimensions of the insert 18 are selected such that, when the upper part 17 is placed with the lower side 27.1 on the upper side 16.1, the insert 18 is received in a form-fitting manner in the section 26.1 of the recess 26 and the lower side 18.1 of the insert 18 which faces away from the basic body 27 lies in the plane E. The channel section 19.1 or the trough-like depression which forms this section is integrally formed in the lower side 18.1. Both parts are fixed to one another by means of screws (not shown) which engage through holes 28 of the upper part 17 and of the basic body 27 into threaded holes 29 of the lower part 16.

The protrusion 23 forms a surface 23.1 which lies in a common XZ plane, that is to say in the plane E, with the lower edge of the nozzle opening 20 which extends in the direction of the Z-axis, and as a result acts as an additional lip for stabilizing and aligning the nozzle jet 14.

Figure 11:
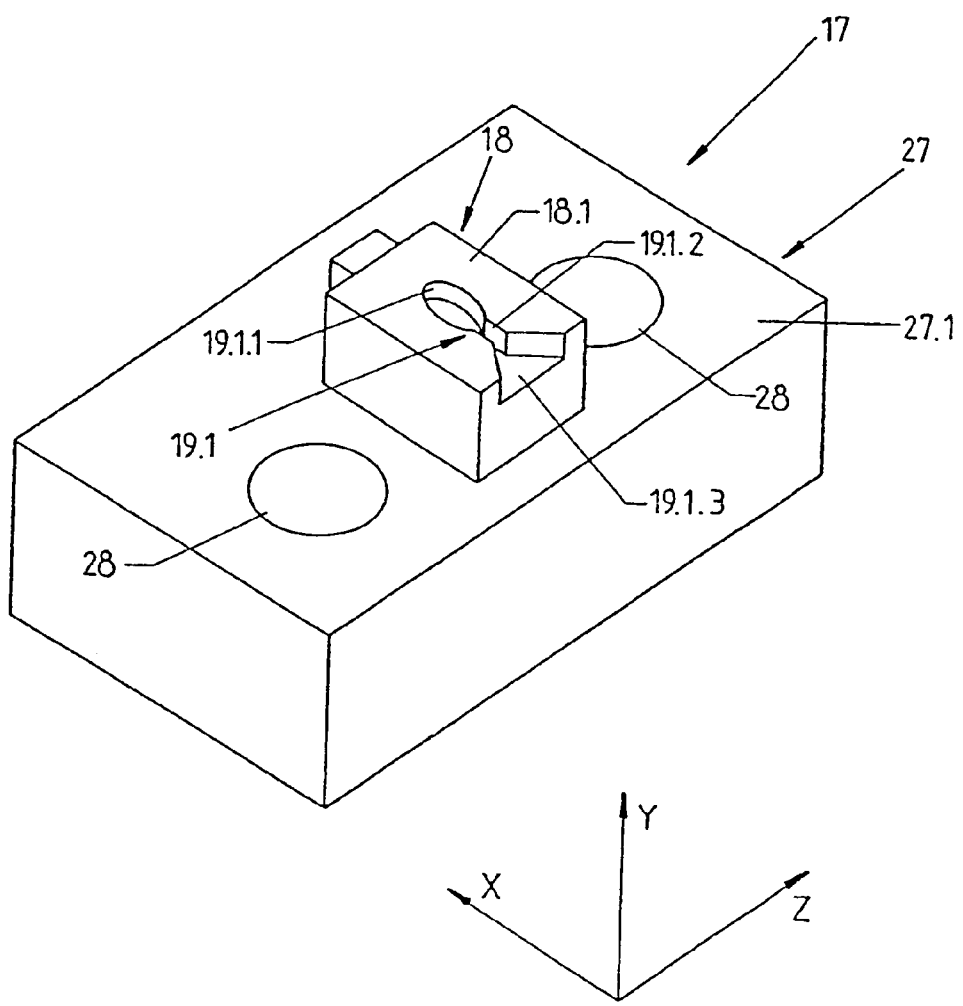
FIGS. 11 and 12 show in a perspective diagram and in a view from below the nozzle upper part of the washing nozzle of FIG. 7 in a view which has been turned with respect to the installation state.
Figure 12:
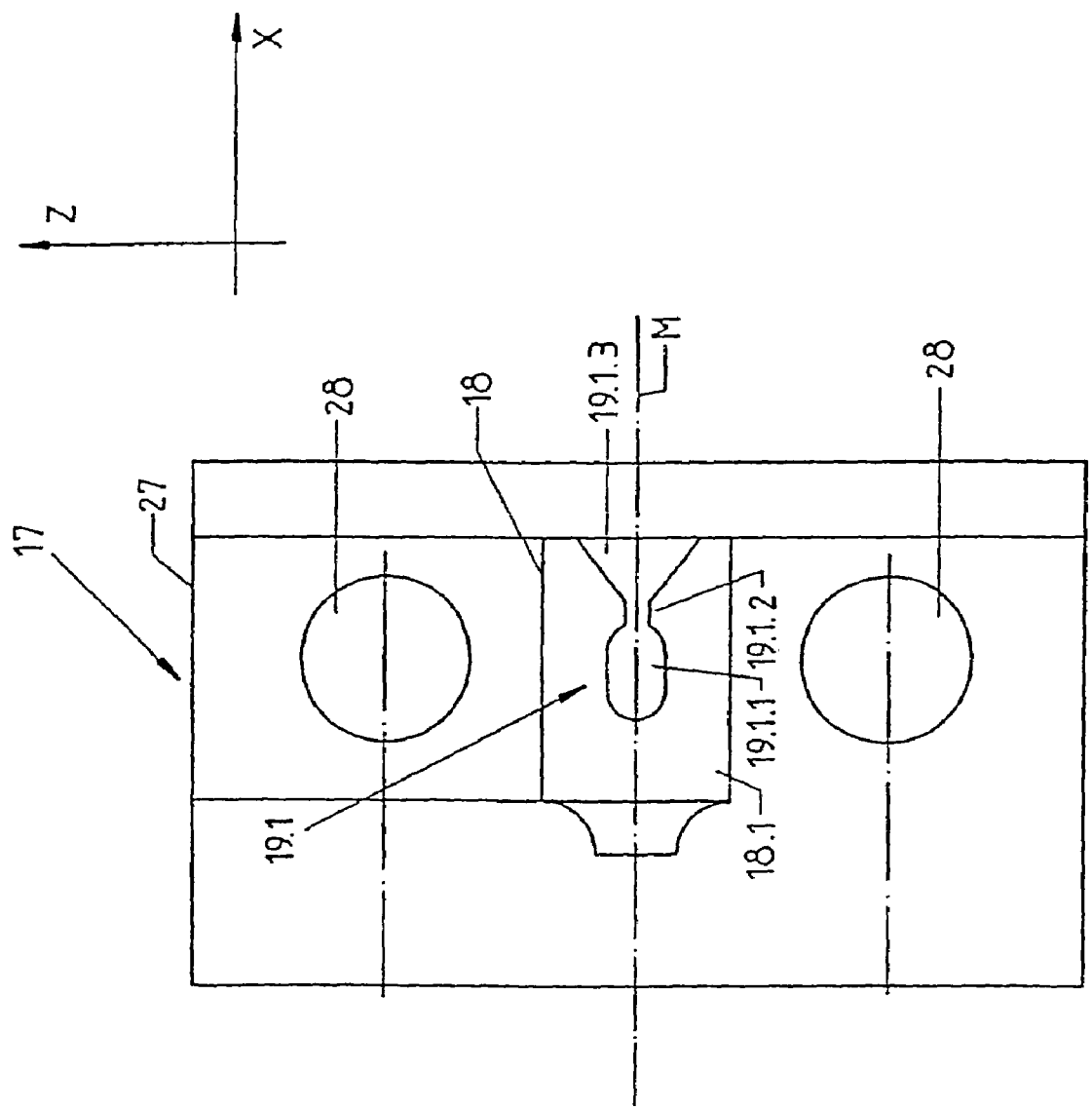

FIGS. 11-13 show, as a further possible embodiment, a washing nozzle 13a which differs from the washing nozzle 13 essentially only in that the lower part 16a has only one recess corresponding to the section 26.1, in which the insert 18a which corresponds to the insert 18 is inserted, wherein the lower part 16a on the front side 13.1a of the washing nozzle 13 has a step-like protrusion 23a which projects beyond the nozzle opening 20a and the surface 23.1a of which that lies in the XZ plane once again serves to stabilize the emerging nozzle jet. Of course, in this embodiment, the insert 18a can also once again be part of an upper part which corresponds to the upper part 17 and has a basic body which corresponds to the basic body 27.

FIGS. 13 and 14 are diagrams similar to FIGS. 7 and 8 in the case of a further possible embodiment.

The invention has been explained above on the basis of examples of embodiments. It will be understood that numerous changes and modifications are possible without departing from the concept on which the invention is based. For example, it is possible in the washing nozzle 1 or in the nozzle insert 3 therein to provide a recess instead of the opening 6 on the upper side 3.1, which recess, as shown in FIG. 4 by the broken line 30, is then designed as a continuous window in a part-region which is remote from the channel grooves 7, through which window the liquid cleaning medium passes into the chamber 6a via the supply channel 9.1, whereas otherwise the recess is designed only as a depression into which the channel grooves 7 open in each case at one end.

TABLE 1

| Part Number | Part Name |
|---|---|
| 1 | washing nozzle |
| 1.1 | nozzle front side |
| 2 | nozzle body |
| 2.1 | nozzle body upper side |
| 2.2 | nozzle body front side |
| 2.3 | nozzle body rear side |
| 2.4 | nozzle body longitudinal side |
| 3 | nozzle insert |
| 3.1 | upper side of nozzle insert |
| 3.2 | lower side of nozzle insert |
| 3.3 | front side of nozzle insert |
| 3.3.1 | bevelled corner region |
| 3.4 | longitudinal side of nozzle insert |
| 4 | recess |
| 4.1, 4.2 | section of recess |
| 4.3 | transition between sections 4.1 and 4.2 |
| 5 | nozzle opening |
| 6 | recess or opening |
| 6.1, 6.2 | section of recess |
| 6a | chamber |
| 7 | channel groove |
| 7a | internal nozzle channel section |
| 8 | nozzle channel |
| 9.1, 9.2 | supply channel |
| 9.1.1, 9.2.1 | opening or mouth of supply channel |
| 10 | punctiform jet |
| 11 | fan-shaped jet |
| 12 | control valve |
| 13, 13a | washing nozzle |
| 13.1, 13.1a | nozzle front side |
| 14 | nozzle jet |
| 15 | nozzle body |
| 16, 16a | nozzle body lower part |
| 16.1 | upper side |
| 16.2 | front side |
| 17 | nozzle body upper part |
| 18, 18a | insert |
| 18.1 | lower side |
| 19 | nozzle channel |
| 19.1, 19.2 | nozzle channel section |
| 19.1.1, 19.1.2, 19.1.3 | part-section |
| 20, 20a | nozzle opening |
| 21 | supply channel |
| 21.1 | mouth of supply channel |
| 22 | end |
| 23, 23a, 24 | protrusion |
| 23.1, 23.1a | surface |
| 25 | recess |
| 26 | recess |
| 26.1, 26.2 | section of recess 26 |
| 27 | basic body of upper part 17 |
| 27.1 | lower side |
| 28 | hole |
| 29 | threaded hole |
| 30 | edge line |
| A | main stream |
| B | collision stream |
| E | plane |
| M, M' | center plane |
| X, Y, Z | spatial axis |
| α, β | angle |

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A washing nozzle for use on vehicles for applying a liquid cleaning or washing medium, wherein at least one nozzle channel in a nozzle body comprises at least one nozzle opening being formed by said at least one nozzle channel for the exit of at least one nozzle jet wherein said at least one nozzle jet comprises at least one supply line which opens into said at least one nozzle channel for supplying said liquid cleaning or washing medium, and wherein said at least one nozzle channel comprises at least one section in said at least one nozzle channel for generating at least one primary or main jet from said liquid cleaning or washing medium, wherein means for acting on said at least one primary or main jet with a collision jet within the nozzle body in a collision and/or mixing chamber is provided upstream of said at least one nozzle opening in the flow direction, wherein said at least one nozzle channel has at least two channel sections having a reduced cross section, and wherein said at least two channel sections having a reduced cross section are arranged with their axes in a common plane (XZ plane).

2. The washing nozzle according to claim 1, wherein when said washing nozzle is formed with a slot-shaped nozzle opening in order to generate a fan-shaped or flat nozzle jet, said common plane (XZ plane) lies parallel to a longer side of said slot-shaped nozzle opening.

3. A washing nozzle for use on vehicles for applying a liquid cleaning or washing medium, wherein said washing nozzle comprises at least one nozzle channel in a nozzle body, wherein said nozzle body comprises at least one nozzle opening formed by said at least one nozzle channel for the exit of at least one nozzle jet wherein at least one supply line opens into said at least one nozzle channel for supplying said liquid cleaning or washing medium, and wherein at least one section in said at least one nozzle channel generates at least one primary or main jet from said liquid cleaning or washing medium, wherein means for acting on said at least one primary or main jet with a collision jet within said nozzle body in a collision and/or mixing chamber is provided upstream of said nozzle opening in the flow direction, and wherein said at least one nozzle channel has at least two parallel channel sections which are each connected to a supply line for said liquid cleaning or washing medium and of which one channel section has the region for forming said at least one primary or main jet and the other channel section ends downstream of the region for forming at least one primary or main jet in the flow direction and is connected there to said collision and/or mixing chamber.

4. The washing nozzle according to claim 3, wherein the other channel section is connected over its entire length to the first channel section.

5. The washing nozzle according to claim 3, wherein the channel sections are connected to a common supply line.

6. The washing nozzle according to claim 3, wherein the first channel section has, starting from the supply line, in a first axis direction (X-axis), one after the other, a first part-section which extends in the flow direction, then a second part-section which narrows and expands again in at least a second axis (Z-axis) perpendicular to said first axis (X-axis), and then a third part-section which increasingly widens in said at least a second (Z-axis) and ends in said at least one nozzle opening.

7. The washing nozzle according to claim 6, wherein the first part-section and/or the second part-section and/or the third part-section have a constant or almost constant dimension in a third axis (Y-axis) perpendicular to said at least a second axis (Z-axis).

8. The washing nozzle according to claim 7, wherein the other channel section has in said third axis (Y-axis) a cross-sectional dimension which is smaller than the cross-sectional dimension which the first channel section has in said third axis (Y-axis).

9. The washing nozzle according to claim 6, wherein the other channel section has a constant or almost constant width in said at least a second axis (Z-axis), for example a width which is equal to or almost equal to the width of the first part-section of the first channel section.

10. The washing nozzle according to claim 3, wherein the other channel section has a cross section which is smaller than the cross section of the first channel section.

11. A washing system for use on vehicles for applying a fluid medium, comprising:

a nozzle body comprising at least one nozzle channel and at least one nozzle opening in communication with said at least one nozzle channel, respectively, for the exit of at least one nozzle jet of the fluid medium; and at least one supply channel in communication with said at least one nozzle channel;

said at least one nozzle channel comprising a first section for generating at least one first jet of fluid medium and a second section for providing at least one collision jet of fluid medium for colliding with said at least one first jet of fluid medium in a mixing chamber in said nozzle body; said second section being located upstream of said at least one nozzle opening; and wherein said first section is formed by at least one narrowing or adjoining expansion in said at least one nozzle channel in a direction of fluid flow;

wherein said at least one narrowing or adjoining expansion is provided by defining said at least one supply channel to comprise a cross section at said first section to be smaller than a cross section of said at least one nozzle opening.

12. A washing system for use on vehicles for applying a fluid medium, comprising:

a nozzle body wherein said nozzle body comprises at least one nozzle channel and at least one nozzle opening in communication with said at least one nozzle channel, respectively, for the exit of at least one nozzle jet of fluid medium; and at least one supply channel in communication with said at least one nozzle channel;

wherein said at least one nozzle channel comprises a first section for generating at least one first jet of fluid medium and a second section for providing at least one collision jet of fluid medium for colliding with said at least one first jet of fluid medium in a mixing chamber in said nozzle body; said second section being located upstream of said at least one nozzle opening; and wherein said at least one nozzle channel comprises a plurality of parallel channel sections that are each connected to a supply line of a supply of said fluid medium.

13. The washing system as recited in claim 12 wherein a first one of a plurality of parallel channel sections provides said at least one first jet of fluid medium and a second one of a plurality of parallel channel sections provides said at least one collision jet of fluid medium, wherein said second one of said plurality of parallel channel sections is associated with said mixing chamber and is downstream of said first one of said plurality of parallel channel sections.

14. The washing system as recited in claim 13 wherein said second one of said plurality of parallel channel sections is in fluid communication with said first one of said plurality of parallel channel sections over its entire length.

15. The washing system as recited in claim 14 wherein said second one of said plurality of parallel channel sections and said first one of said plurality of parallel channel sections are coupled to a common fluid supply line.

* * * * *